United States Patent
Beaudeau et al.

(10) Patent No.: US 11,159,939 B2
(45) Date of Patent: Oct. 26, 2021

(54) FEATURELESS LOW-PROBABILITY INTERCEPTION/DETECTION WAVEFORM VIA CONTINUOUSLY VARIABLE SYMBOL RATE TRANSMISSION

(71) Applicant: BAE Systems Information and Electronic Systems Integration Inc., Nashua, NH (US)

(72) Inventors: Jonathan P. Beaudeau, Littleton, MA (US); Prabahan Basu, Lexington, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 74 days.

(21) Appl. No.: 16/669,822

(22) Filed: Oct. 31, 2019

(65) Prior Publication Data
US 2021/0136568 A1 May 6, 2021

(51) Int. Cl.
*H04W 12/00* (2021.01)
*H04W 12/033* (2021.01)
(Continued)

(52) U.S. Cl.
CPC .......... *H04W 12/033* (2021.01); *H04L 1/006* (2013.01); *H04L 27/2021* (2013.01)

(58) Field of Classification Search
CPC .......... H04W 12/033; H04W 27/2021; H04W 1/006
See application file for complete search history.

(56) References Cited

U.S. PATENT DOCUMENTS 7,280,464 B1 * 10/2007 Newhouse .......... H04L 27/2662 370/203
7,876,845 B2 * 1/2011 Karabinis ................ H04K 1/00 375/260
(Continued)

FOREIGN PATENT DOCUMENTS

| EP | 2146453 A2 * | 1/2010 | .......... H04B 14/023 |
| EP | 2146454 A2 * | 1/2010 | .......... H04J 13/0048 |
| WO | WO-2008022241 A1 * | 2/2008 | .......... H04B 1/713 |

OTHER PUBLICATIONS

Ungerboeck, Gottfried, "Trellis-Coded Modulation with Redundant Signal Sets Part I: Introduction", IEEE Communications Magazine, Feb. 1987, vol. 25, pp. 5-21.

*Primary Examiner* — Jay P Patel
(74) *Attorney, Agent, or Firm* — Finch & Maloney PLLC; Scott J. Asmus

(57) ABSTRACT

Techniques are disclosed for generating a featureless low-probability-of-intercept/low-probability-of-detection (LPI/LPD) waveform via a continuously variable symbol rate transmission. A continuous-phase-modulation (CPM) signal can be represented with a phase trellis. During each symbol duration, the trellis is traversed in either a positive or negative direction in a continuous fashion from the starting phase value to the end phase value. The rate at which the trellis is traversed is varied continuously as a time-varying function. The time-varying phase velocity function, or instantaneous symbol rate, is a type of spreading code or secret key shared between the transmitter and receiver. The disclosed techniques can be implemented with CPM compromising the constant-modulus property of CPM signals.

17 Claims, 5 Drawing Sheets

(51) Int. Cl.
 *H04L 27/20* (2006.01)
 *H04L 1/00* (2006.01)

(56) References Cited

U.S. PATENT DOCUMENTS

| | | |
|---|---|---|
| 8,976,837 B1 | 3/2015 | Lomp et al. |
| 2011/0002362 A1* | 1/2011 | Michaels .............. H04L 27/001 |
| | | 375/138 |
| 2014/0171030 A1* | 6/2014 | Karabinis ............ H04B 1/7097 |
| | | 455/411 |
| 2017/0150348 A1* | 5/2017 | Kowalevicz .......... H04L 9/0816 |
| 2017/0163296 A1* | 6/2017 | Terry ................... H04B 7/0413 |

* cited by examiner

FEATURELESS LOW-PROBABILITY INTERCEPTION/DETECTION WAVEFORM VIA CONTINUOUSLY VARIABLE SYMBOL RATE TRANSMISSION

STATEMENT OF GOVERNMENT INTEREST

This invention was made with United States Government assistance under Contract No. N00039-15-D-0007 awarded by the U.S. Navy. The United States Government has certain rights in this invention.

FIELD OF THE DISCLOSURE

This disclosure relates generally to the field of radio communications, and more particularly, to techniques for generating a featureless low-probability-of-intercept/low-probability-of-detection (LPI/LPD) waveform via a continuously variable symbol rate transmission.

BACKGROUND

Conventional communications waveforms give off a distinct cyclostationary signature due to the nature of the fixed intervals upon which new information is conveyed (i.e. the symbol or chip rate). This signature can be identified via intercepting detectors through cyclostationary/high-order statistics analysis even in very low signal-to-noise (SNR) scenarios. The ability to identify the waveform signature relatively easily is disadvantageous in situations where secure or covert communications are desired. Some existing techniques for providing secure or covert communications impose constraints that limit their use in practical applications. Therefore, complex and non-trivial issues associated with generating featureless LPI/LPD waveforms remain due to the limitations of these existing techniques.

DETAILED DESCRIPTION

Figure 1:
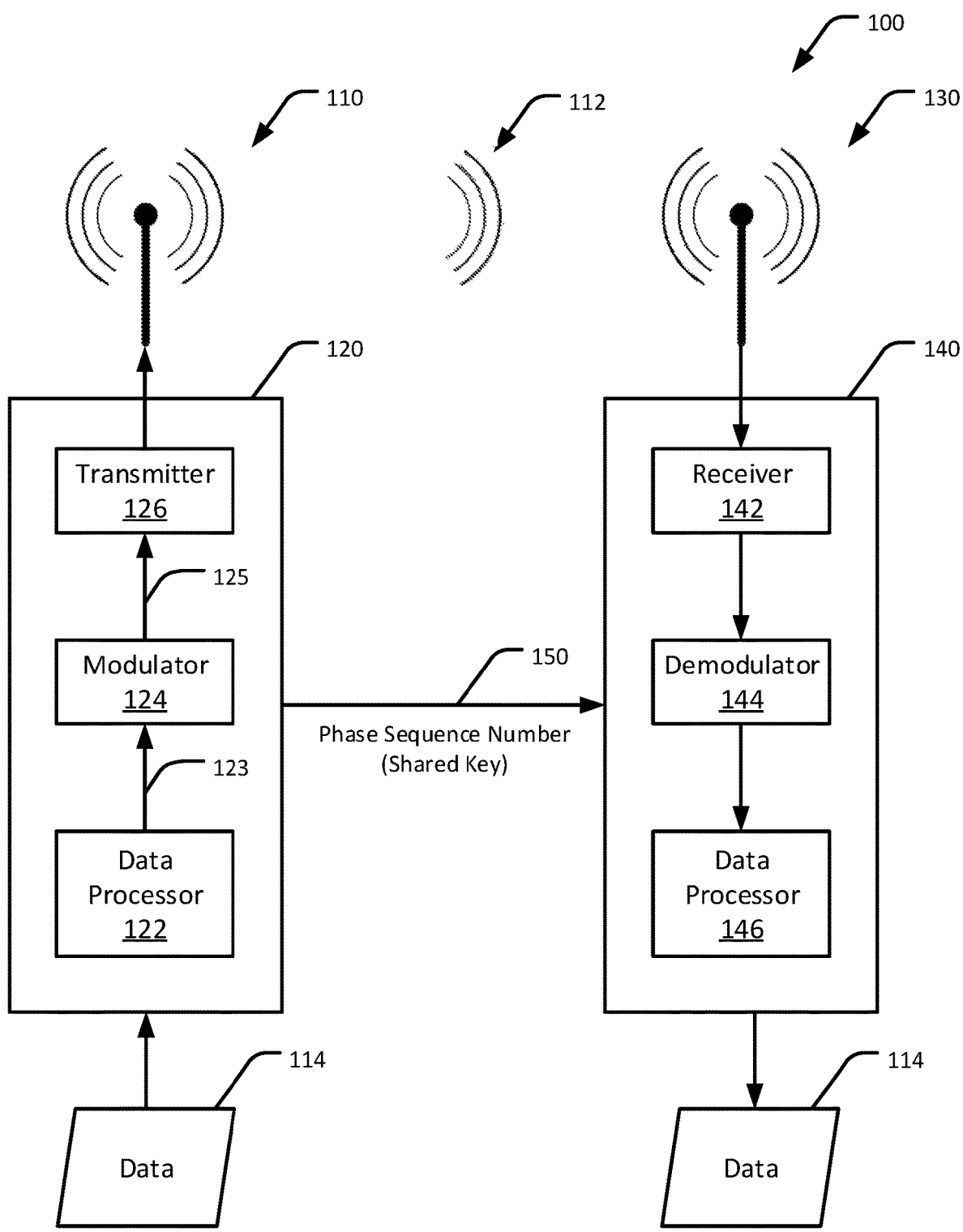
FIG. 1 is a block diagram of an example communication system, in accordance with an embodiment of the present disclosure.

Techniques are disclosed for generating a featureless low-probability-of-intercept/low-probability-of-detection (LPI/LPD) waveform via a continuously variable symbol rate transmission. A continuous-phase-modulation (CPM) signal can be represented with a phase trellis. During each symbol duration, the trellis is traversed in either a positive or negative direction in a continuous fashion from the starting phase value to the end phase value. The amount by which the trellis is traversed is related to the symbol rate and the modulation order and can be thought of as a phase "velocity," which is a continuous time-variant contraction/dilation of the time axis. The rate at which the trellis is traversed is varied continuously such that the phase "velocity" is not fixed but is instead a time-varying function. Note that in conventional CPM, the rate at which the trellis is traversed is fixed. The time-varying phase velocity function, or instantaneous symbol rate, is a type of spreading code or secret key shared between the transmitter and receiver. The disclosed techniques can be implemented with the constant-modulus property of CPM signals. However, while certain embodiments specifically pertain to CPM signal types, it will be appreciated that the disclosed techniques can also be comparably applied to other types of waveform modulation as well.

A waveform generated according to certain embodiments described in this disclosure effectively eliminates the distinctive cyclostationary signature (feature) of a conventional CPM signal by continuously and pseudo-randomly varying the rate at which information is conveyed. The symbol rate is not fixed as it is in a conventionally modulated signal. Instead, the symbol rate is varied at a rate that is a shared secret between the transmitter and the receiver. This significantly enhances covert or LPI/LPD communications and offers a potentially low-cost augmented layer of information security by preventing the data bits from being easily demodulated.

General Overview

A signal according to certain embodiments of the present disclosure can be generated with LPI/LPD characteristics to avoid detection and reception in covert applications. As previously explained, there are non-trivial problems associated with generating featureless LPI/LPD waveforms. For instance, it is possible to apply a nonlinear regression operation to a cyclical signal that exposes characteristic features of the signal out of the noise floor. Conventional approaches to generating featureless LPI/LPD waveforms include spreading the signal across a wide bandwidth or broadcasting the signal at low power, both of which increase the difficulty of detection. However, even with these techniques, it is still possible to detect these signals and expose their features due to the inherent repetitions of the signal. Encoding the signal with a private pre-shared key (PPSK) is another conventional approach to generating a covert waveform. The PPSK waveform is transmitted at zero and 180-degree phases. However, the features can be easily exposed by simply squaring the signal, the result of which is a loud tone at zero degrees. Yet other conventional approaches to generating a covert waveform include introducing jitter into a pulse-position modulation (PPM) signal, which introduces random spacing variations between symbols in the time domain. However, it is more difficult to operate in the time domain than in the frequency domain. Another technique is chip rate hopping, where the chip rate is changed for each pulse. Although such an approach may mitigate the cyclostationary signature to some extent, line spectra will still be present due to the discontinuities introduced by such an approach.

To this end, improved techniques for generating featureless LPI/LPD waveforms are herein disclosed. These techniques effectively wipe out detectable features by continuously modulating the waveform in a variable manner. In an example embodiment, the rate at which symbols are transmitted is varied by reweighting the amplitude of the phase information using a random noise signal. This causes the signal to have nonlinear features, which are more difficult to detect than conventional CPM signals. The variance of the symbol rate is a shared secret between the transmitting and receiving nodes. Numerous variations will be apparent.

System Architecture

FIG. 1 is a block diagram of an example communication system 100, in accordance with an embodiment of the present disclosure. The system 100 includes a transmitting antenna 110, a transmitting device 120, a receiving antenna 130, and a receiving device 140. For clarity, the transmitting device 120 is described with respect to its transmitting functions and the receiving device 140 is described with respect to its receiving functions. However, it will be appreciated that the transmitting device 120 and the receiving device 140 can each act as a transmitter, a receiver, or both a transmitter and a receiver (i.e., a transceiver). The transmitting device 120 is operatively coupled to the transmitting antenna 110, and the receiving device is operatively coupled to the receiving antenna 130. The transmitting antenna 110 wirelessly broadcasts a signal 112 that can be received by the receiving antenna 130. The signal 112 includes a waveform generated by the transmitting device 120 based on data 114, which is encoded into the waveform. The receiving device 140 decodes the data 114 in the waveform of the received signal 112.

The transmitting device 120 includes a data processor 122, a modulator 124, and a transmitter 126. The data processor 122 is configured to receive the data 114 and provide the data 114 to the modulator 124 in the form of one or more symbols 123. The modulator 124 is configured to generate a featureless LPI/LPD waveform 125 from the symbols via continuous phase modulation, as described in further detail with respect to FIGS. 2 and 3. The modulator 124 is further configured to generate a phase sequence number 150, which is shared with the receiving device 140 and is functionally similar to a shared secret cryptographic key. The transmitter 126 is configured to convert the waveform 125 generated by the modulator 124 into the signal 112 via the transmitting antenna 110.

The receiving device 140 includes a receiver 142, a demodulator 144, and a data processor 146. The receiver 142 is configured to convert the signal 112 via the receiving antenna 130 back into the waveform generated by the modulator 124 of the transmitting device 120. The demodulator 144 is configured to generate one or more symbols from the waveform using the phase sequence number 150. The demodulator 144 employs a demodulation scheme that is complementary to the modulation scheme employed by modulator 124. The data processor 146 is configured to convert the symbols back into the data 114 that was originally received by the transmitting device 120.

In some embodiments, the transmitting device 120 and/or the receiving device 140 may be implemented in a vehicle, an aircraft, a vessel, or the electronic systems of the vehicle, aircraft or vessel. In other embodiments, the transmitting device 120 and/or the receiving device 140 can be implemented as stationary nodes. In some embodiments, the data processors 122, 146 may include any combination of a processor, a memory, an input/output (I/O) system, a user interface, a display element, and a storage. Other componentry and functionality not reflected in FIG. 1 will be apparent in light of this disclosure, and it will be appreciated that other example embodiments are not limited to any particular hardware or platform configuration.

The data processors 122, 146 can be any suitable processor, and may include one or more coprocessors or controllers, such as an audio processor, a graphics processing unit, or hardware accelerator, to assist in control and processing operations associated with the system 100. In some embodiments, the processors 122, 146 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors 122, 146 may be multithreaded cores in that they may include more than one hardware thread context (or "logical processor") per core. The processor 122, 146 may be implemented as a complex instruction set computer (CISC) or a reduced instruction set computer (RISC) processor.

The memory can be implemented using any suitable type of digital storage including, for example, flash memory and/or random-access memory (RAM). In some embodiments, the memory may include various layers of memory hierarchy and/or memory caches as are known to those of skill in the art. The memory may be implemented as a volatile memory device such as, but not limited to, a RAM, dynamic RAM (DRAM), or static RAM (SRAM) device. The storage may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

The data processors 122, 146 may be configured to execute an operating system (OS) which may comprise any suitable operating system, such as Google Android® (Google Inc., Mountain View, Calif.), Microsoft Windows® (Microsoft Corp., Redmond, Wash.), Apple OS X® (Apple Inc., Cupertino, Calif.), Linux®, or a real-time operating system (RTOS). As will be appreciated, the techniques provided herein can be implemented without regard to the particular operating system and therefore may also be implemented using any suitable system, whether commercially available or proprietary.

An I/O system (not shown) may be configured to interface between various I/O devices and other components of the system 100. I/O devices may include, but not be limited to, a user interface and a display element. The user interface may include other devices (not shown) such as a touchpad, keyboard, mouse, microphone and speaker, trackball or scratch pad, and camera. The I/O system may include a graphics subsystem configured to perform processing of images for rendering on the display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into the data processors 122, 146 or any chipset of the system 100.

It will be appreciated that in some embodiments, some of the various components of the system 100 may be combined or integrated in a system-on-a-chip (SoC) architecture, while in other embodiments some of the various components of the system 100 may be distributed across a communications network. In some embodiments, the components may be hardware components, firmware components, software components or any suitable combination of hardware, firmware or software.

The transmitting device 120 and the receiving device 140 may include any or all the circuits/components illustrated in FIGS. 1-4 as described herein. These components can be implemented or otherwise used in conjunction with a variety of suitable software and/or hardware that is coupled to or that otherwise forms a part of the system 100. These components can additionally or alternatively be implemented or otherwise used in conjunction with user I/O devices that can provide information to, and receiving information and commands from, a user.

Various embodiments of the system 100 may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, yet still cooperate or interact with each other.

The various embodiments disclosed herein can be implemented in various forms of hardware, software, firmware, and/or special purpose processors. For example, in one embodiment, a computer program product includes at least one non-transitory computer readable storage medium which has instructions encoded thereon that, when executed by one or more processors, cause one or more of the methodologies disclosed herein to be carried out. Other componentry and functionality not reflected in the illustrations will be apparent in light of this disclosure, and it will be appreciated that other embodiments are not limited to any particular hardware or software configuration. Thus, in other embodiments the system 100 may include additional, fewer, or alternative subcomponents as compared to those included in the example embodiment of FIG. 1.

The non-transitory computer readable medium may be any suitable physical medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). In some embodiments, the hardware may be modeled or developed using hardware description languages such as, for example Verilog or VHDL. Still other embodiments may be implemented with a microcontroller having several input/output ports for receiving and outputting data, and several embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, or one or more embedded routines configured to cause the circuitry to perform any of the operations. Software may be embodied as a software package, code, instructions, instruction sets and/or data recorded on a computer-readable storage device. Software may be embodied or implemented to include any number of processes, and processes, in turn, may be embodied or implemented to include any number of threads or parallel processes in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), computers, and other processor-based or functional systems. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Example Modulator

Figure 2:
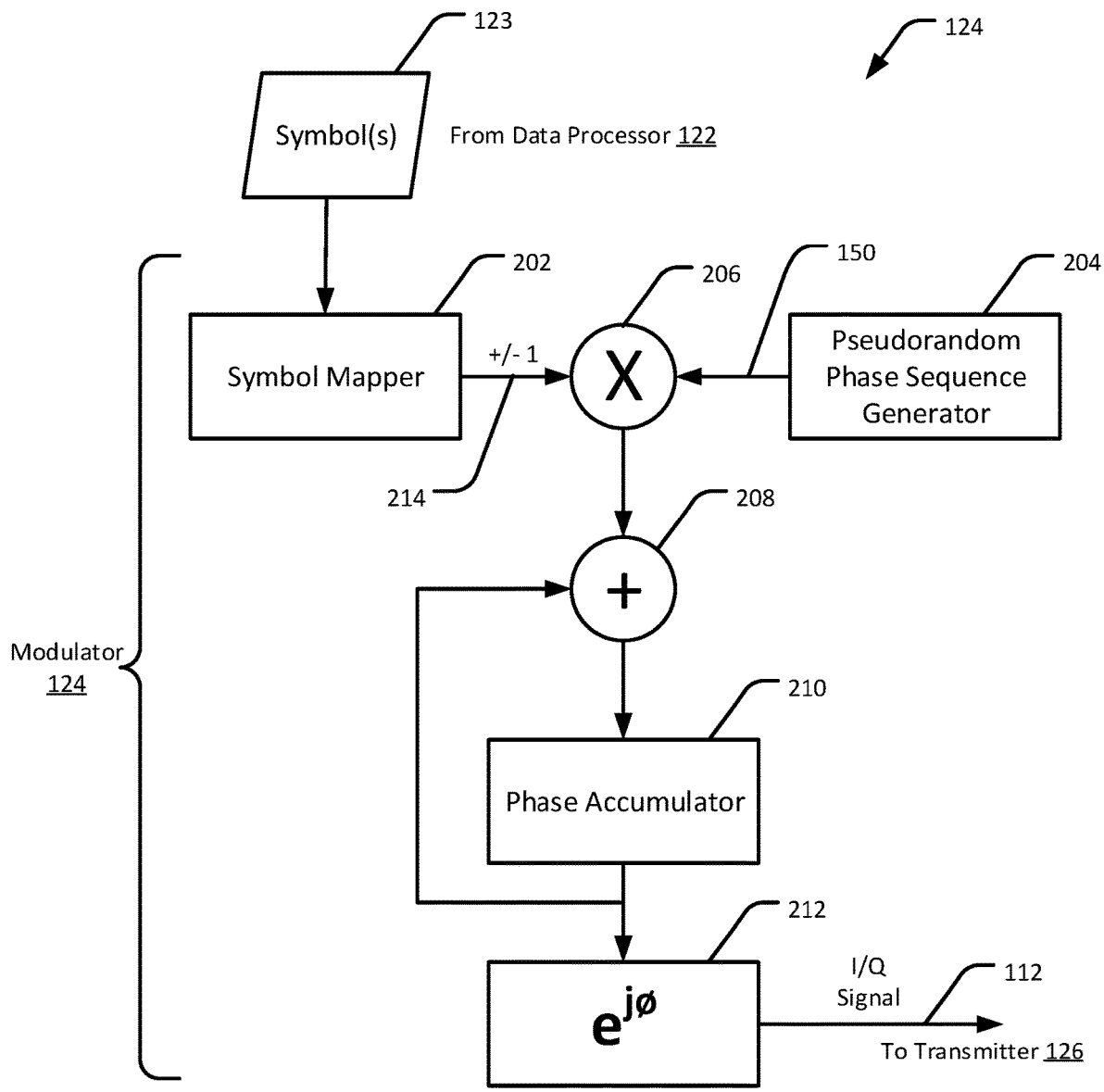
FIG. 2 is an example schematic block diagram of a modulator that can be used in a communication system such as the one depicted in FIG. 1, in accordance with an embodiment of the present disclosure.

FIG. 2 is an example schematic block diagram of the modulator 124 of FIG. 1, in accordance with an embodiment of the present disclosure. The demodulator 144 of FIG. 1 is similar. The modulator 124 includes a symbol mapper 202, a pseudorandom phase sequence generator, a multiplier circuit 206, and adder circuit 208, a phase accumulator 210, and an I/Q signal generator 212.

As noted above, the modulator 124 receives one or more symbols 123 from the data processor 122. The symbol mapper 202, adder circuit 208, phase accumulator 210, and I/Q signal generator 212 are in a similar arrangement as a conventional CPM waveform generator. CPM modulates the phase of the carrier signal continuously by gradually changing the phase of the carrier from a starting value to an ending value over the duration L of a symbol. With a conventional CPM arrangement, the symbol mapper 202 generates a trellis coded waveform 214 using a trellis (convolutional) modulation coding scheme continuously and at a constant rate that is a function of the symbol rate L/t and modulation order. In a trellis code, a parity bit is applied to each symbol. The phase accumulator 210 and adder circuit 208, for example, account for the cumulative total phase of all previously transmitted symbols, also known as the phase memory. The receiver must also process the entire sequence of symbols to account for the phase memory. The I/Q signal generator 212 then outputs a quadrature signal 112 from the continuously modulated signal.

Figure 3A:
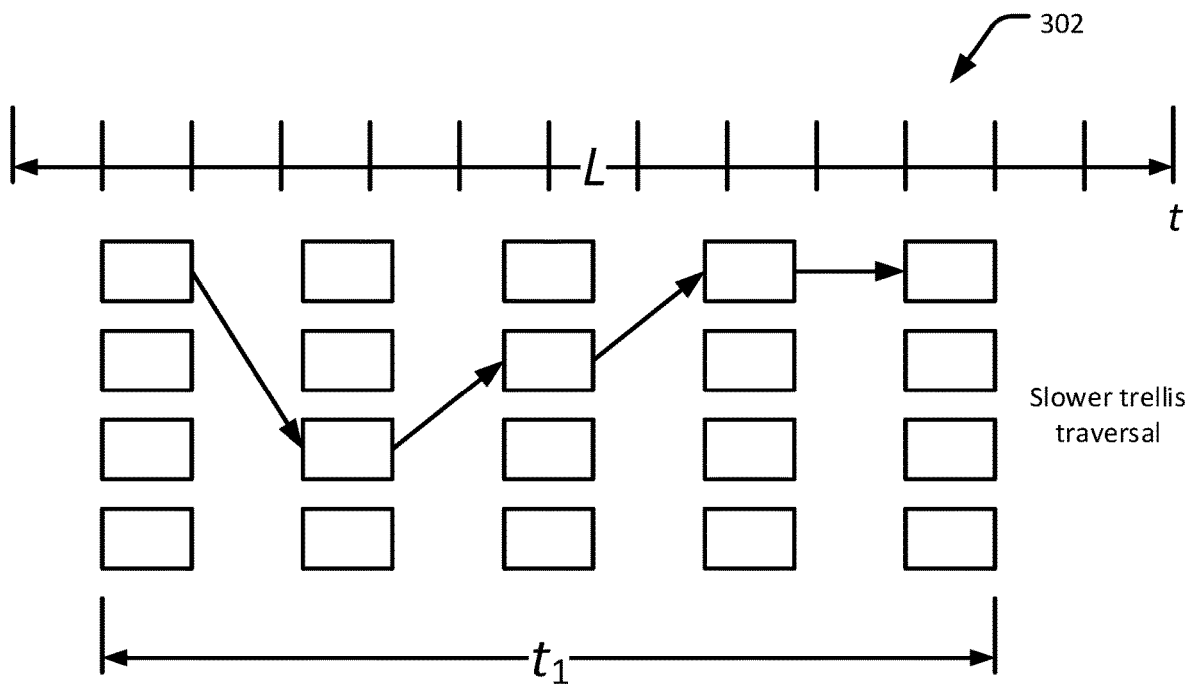
FIGS. 3A and 3B show two example trellis traversals, in accordance with an embodiment of the present disclosure.
Figure 3B:
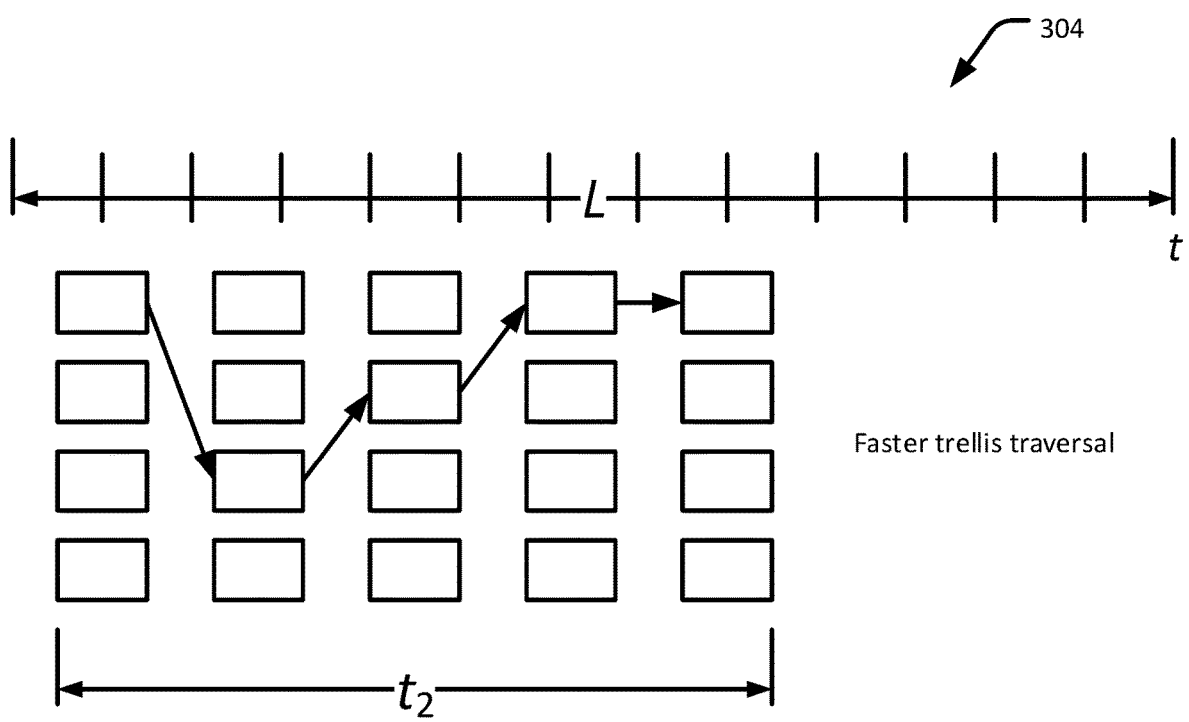

In certain embodiments, however, the conventional CPM technique is modified in a significant way, such as shown in FIG. 2. Specifically, the pseudorandom phase sequence generator 204, which is not present in a conventional CPM device, generates the phase sequence number 150 that changes between different cycles of the carrier signal. The phase sequence number 150 is a pseudorandom real number that is used to vary, via the multiplier circuit 206, the rate L/t at which the phase trellis is traversed (such as discussed with reference to FIGS. 3A and 3B) within a range that is less than or equal to the constant symbol duration L, and thus vary the location of the symbol encoding within each cycle of the carrier wave of the signal 112. This causes a continuous time-variant contraction or dilation of the modulation time axis, such as shown in FIGS. 3A and 3B. In other words, the trellis code is traversed within a period of time that is less than or equal to the constant symbol duration L. By so varying the trellis traversal rate on the transmission side (by changing the phase sequence number 150), the receiving side has no way to independently identify where the symbol is encoded from one cycle of the waveform to the next, which improves the covert nature of the signal 112. Therefore, the phase sequence number 150 is shared with (provided to) each receiver that is intended to receive and demodulate the signal 112 so that the receiver can locate the information encoded therein.

Example Trellis Code Traversal

FIGS. 3A and 3B show two example trellis traversals 302, 304 along a time axis t, in accordance with an embodiment of the present disclosure. For clarity, the trellises depicted in FIGS. 3A and 3B are one-dimensional, although it will be understood that the trellises can be multi-dimensional. In the example of FIG. 3A, a traversal of a trellis 302 representing a sequence of symbols 123 is shown with respect to time, where L is the symbol duration and $t_1$ represents to the total traversal time within the symbol duration. In the example of FIG. 3B, a traversal of a trellis 302 representing a sequence of symbols 123 is shown with respect to time, where L is the symbol duration and $t_2$ represents to the total traversal time within the symbol duration. The traversal times $t_1$ and $t_2$ represent different rates at which the trellis is traversed within the symbol duration L on two different cycles of the carrier signal. The traversal times $t_1$ and $t_2$ are a function of the phase sequence number 115, which is effectively variable since it is a pseudorandom number that is generated on at least a cycle-by-cycle basis of the waveform. As can be seen in these examples, the trellis traversal time in FIG. 3A is slower than the trellis traversal time in FIG. 3B. The trellis traversal time can thus vary within the symbol duration L, which is constant from cycle-to-cycle of the carrier signal.

Example Methodology

Figure 4:
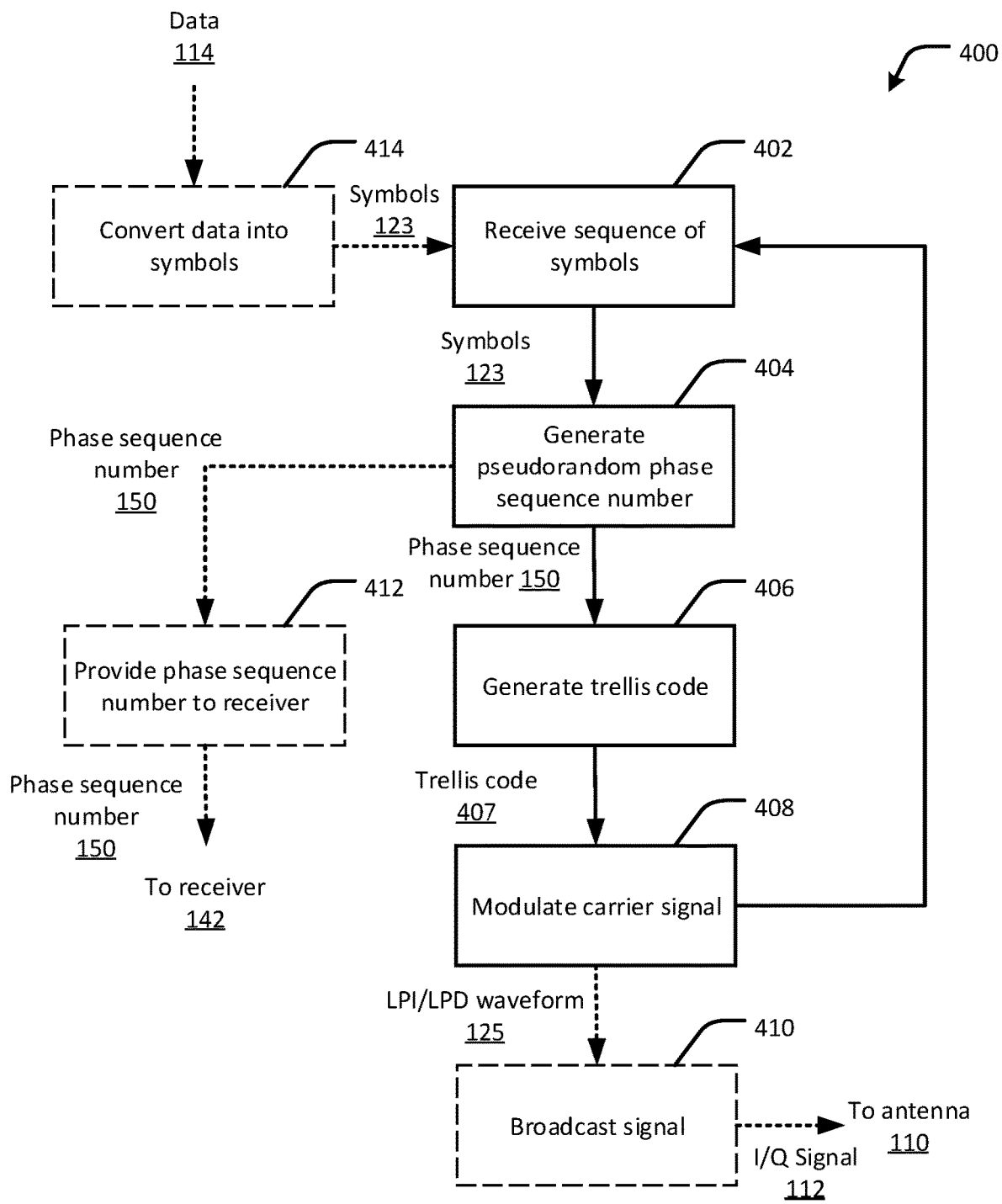
FIG. 4 is a flow diagram of an example method of generating featureless LPI/LPD waveforms, in accordance with an embodiment of the present disclosure.

FIG. 4 is a flow diagram of an example method 400 of generating featureless LPI/LPD waveforms, in accordance with an embodiment of the present disclosure. The method 400 includes receiving 402 a sequence of symbols 123 to be wirelessly transmitted from a transmitting device 120 to a receiving device 140 via a carrier signal 112. The sequence of symbols 123 represents the data 114 or other information that is to be wirelessly communicated from the transmitting device 120 to the receiving device 140. The method 400 further includes generating 404 a pseudorandom phase sequence number 150. The phase sequence number 150 can be any real number. The method 400 further includes generating 406 a trellis code 407 representing the sequence of symbols 123. The trellis code 407 can be generated using any suitable trellis code modulation scheme.

The method 400 further includes continuously modulating 408 the carrier signal by traversing the trellis code 407 at a variable traversal rate that is based on the pseudorandom phase sequence number 150 to produce a featureless LPI/LPD waveform 125, such as discussed with respect to FIGS. 2 and 3. In certain embodiments, the pseudorandom phase sequence number changes between different cycles of the carrier signal, thereby causing the rate at which the trellis code is traversed to vary between different cycles of the carrier signal. This variation in the traversal of the trellis code is useful for eliminating cyclostationary signatures (features) in the waveform, since each cycle of the carrier signal will be modulated differently even when the same sequence of symbols 150 is modulated in consecutive cycles using the same symbol duration L.

In certain embodiments, portions of the method 400 are repeated for each sequence of symbols 123 to be transmitted.

For example, in the first pass of the method 400, the sequence of symbols is a first sequence of symbols, the trellis code is a first trellis code, the phase sequence number is a first phase sequence number, and the variable traversal rate is a first variable traversal rate. In this case, the method further includes receiving 402 a second sequence of symbols to be wirelessly transmitted from the transmitting device to the receiving device via the carrier signal, generating 404 a second pseudorandom phase sequence number that is different from the first pseudorandom sequence number, generating 406 a second trellis code representing the second sequence of symbols, and continuously modulating 408 the carrier signal by traversing the second trellis code at a second variable traversal rate determined by the second pseudorandom phase sequence number, the second traversal rate being different from the first traversal rate.

In certain embodiments, the trellis code is traversed within a period of time that is less than a constant symbol duration L, such as described with respect to FIG. 3. In certain embodiments, the method 400 includes causing the transmitting device to wirelessly broadcast 410 the modulated carrier signal 125 (LPI/LPD waveform) via an antenna 110. In certain embodiments, the broadcasted signal includes an in-phase/quadrature (I/Q) signal 112. In certain embodiments, the method 400 includes causing the transmitting device to provide 412 the phase sequence number 150 to the receiving device. In certain embodiments, the method 400 includes converting 414 input data 114 into the sequence of symbols 123 such that the input data 114 is encoded into the modulated carrier signal 125 via the trellis code 407.

Figure 5:
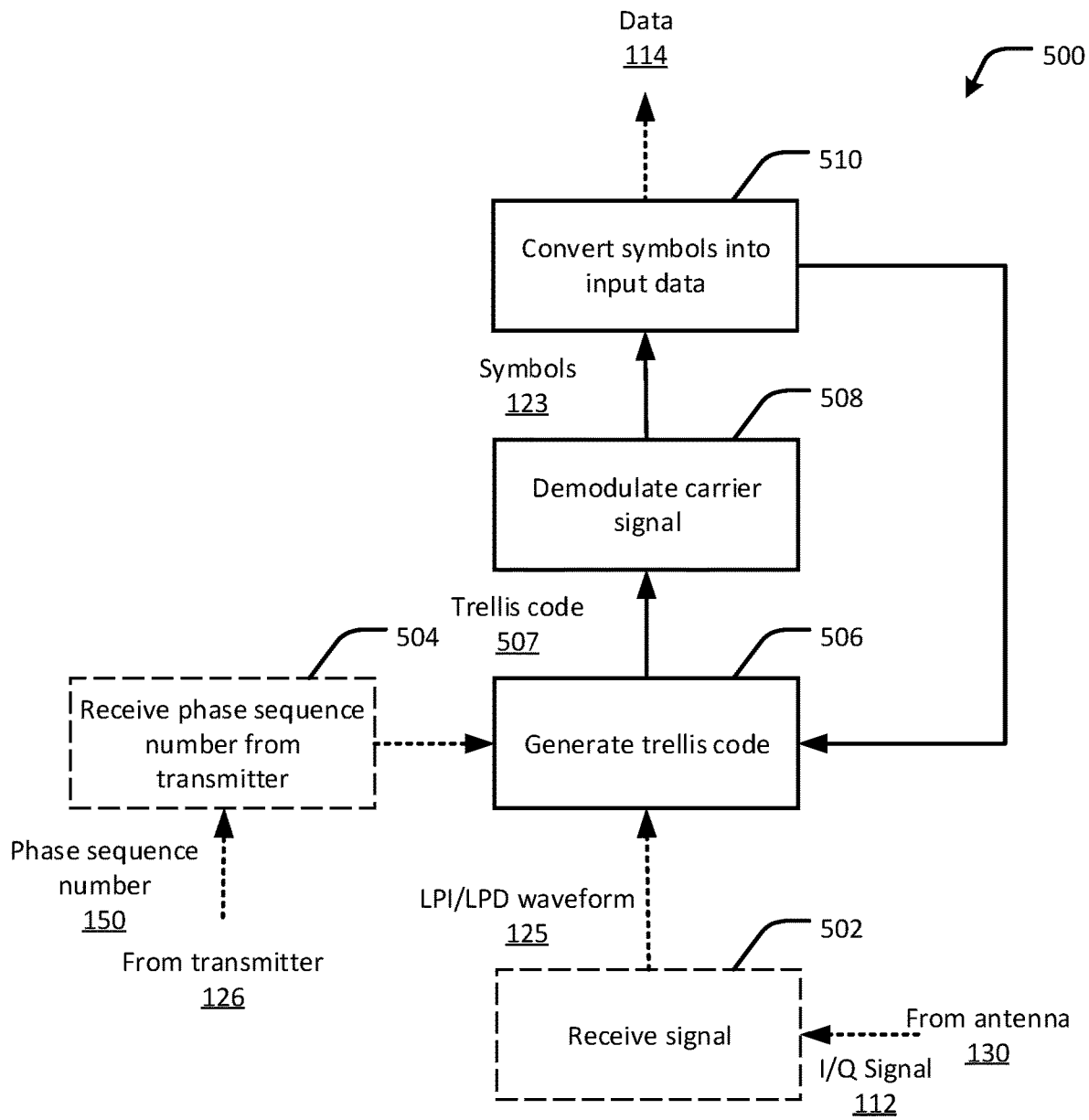
FIG. 5 is a flow diagram of another example method of generating featureless LPI/LPD waveforms, in accordance with an embodiment of the present disclosure.

FIG. 5 is a flow diagram of another example method 500 of generating featureless LPI/LPD waveforms, in accordance with an embodiment of the present disclosure. In certain embodiments, the method 500 includes causing the receiving device 140 to wirelessly receive 502 the modulated carrier signal 125 (LPI/LPD waveform) via the antenna 130. In certain embodiments, the received signal includes an I/Q signal 112. In certain embodiments, the method 500 includes causing the receiving device 140 to receive 504 the phase sequence number 150 from the transmitting device 120. The phase sequence number 150 can be any real number.

The method 500 includes generating 506 a trellis code 507 representing the sequence of symbols 123. The trellis code 507 can be generated using any suitable trellis code modulation scheme. The method 500 further includes continuously demodulating 508 the carrier signal by traversing the trellis code 507 at a variable traversal rate that is based on the pseudorandom phase sequence number 150. In certain embodiments, the trellis code is traversed within a period of time that is less than a constant symbol duration L, such as described with respect to FIG. 3. In certain embodiments, the pseudorandom phase sequence number changes between different cycles of the carrier signal, thereby causing the rate at which the trellis code is traversed to vary between different cycles of the carrier signal. This variation in the traversal of the trellis code is useful for eliminating cyclostationary signatures (features) in the waveform, since each cycle of the carrier signal will be modulated differently even when the same sequence of symbols 150 is modulated in consecutive cycles using the same symbol duration L.

In certain embodiments, the input data 114 is encoded as the sequence of symbols 123 into the modulated carrier signal 125 via the trellis code 507. In some such embodiments, the method 500 includes converting 510 the sequence of symbols 123 obtained from the demodulated carrier signal into the input data 114.

In certain embodiments, portions of the method 500 are repeated for each sequence of symbols 123 to be received. For example, in the first pass of the method 500, the sequence of symbols is a first sequence of symbols, the trellis code is a first trellis code, the phase sequence number is a first phase sequence number, and the variable traversal rate is a first variable traversal rate. In this case, the method further includes receiving 502 the I/Q signal 112, receiving 504 a second pseudorandom phase sequence number that is different from the first pseudorandom sequence number, generating 506 a second trellis code representing a second sequence of symbols, continuously demodulating 508 the carrier signal by traversing the second trellis code at a second variable traversal rate determined by the second pseudorandom phase sequence number, the second traversal rate being different from the first traversal rate, and converting 510 the second sequence of symbols obtained from the demodulated carrier signal into the input data 114.

Additional Examples

Numerous embodiments will be apparent in light of the present disclosure, and features described herein can be combined in any number of configurations. One example embodiment provides a method of generating featureless low-probability-of-intercept/low-probability-of-detection (LPI/LPD) waveforms. The method includes receiving a sequence of symbols to be wirelessly transmitted from a transmitting device to a receiving device via a carrier signal; generating a pseudorandom phase sequence number; generating a trellis code representing the sequence of symbols; and continuously modulating the carrier signal by traversing the trellis code at a variable traversal rate that is based on the pseudorandom phase sequence number. In some cases, the pseudorandom phase sequence number changes between different cycles of the carrier signal thereby causing the rate at which the trellis code is traversed to vary between different cycles of the carrier signal. In some cases, the sequence of symbols is a first sequence of symbols, where the trellis code is a first trellis code, where the phase sequence number is a first phase sequence number, where the variable traversal rate is a first variable traversal rate, and where the method includes receiving a second sequence of symbols to be wirelessly transmitted from the transmitting device to the receiving device via the carrier signal; generating a second pseudorandom phase sequence number that is different from the first pseudorandom sequence number; generating a second trellis code representing the second sequence of symbols; and continuously modulating the carrier signal by traversing the second trellis code at a second variable traversal rate determined by the second pseudorandom phase sequence number, the second traversal rate being different from the first traversal rate. In some cases, the trellis code is traversed within a period of time that is less than a constant symbol duration. In some cases, the method includes causing the transmitting device to wirelessly broadcast the modulated carrier signal via an antenna. In some such cases, the broadcasted signal includes an I/Q signal. In some cases, the method includes causing the transmitting device to provide the phase sequence number to the receiving device. In some cases, the method includes converting input data into the sequence of symbols such that the input data is encoded into the modulated carrier signal via the trellis code.

Another example embodiments provides a communication system including a data processor configured to receive a sequence of symbols to be wirelessly transmitted from a transmitting device to a receiving device via a carrier signal; a phase sequence generator configured to generate a pseudorandom phase sequence number; and a modulator operatively coupled to the data processor and to the phase sequence generator, the modulator configured to generate a trellis code representing the sequence of symbols received by the data processor and to continuously modulate the carrier signal by traversing the trellis code at a variable traversal rate that is based on the pseudorandom phase sequence number generated by the phase sequence generator. In some cases, the phase sequence generator is configured to change the pseudorandom phase sequence number between different cycles of the carrier signal thereby causing the rate at which the trellis code is traversed to vary between different cycles of the carrier signal. In some cases, the sequence of symbols is a first sequence of symbols, where the trellis code is a first trellis code, where the phase sequence number is a first phase sequence number, where the variable traversal rate is a first variable traversal rate, and where the data processor is further configured to receive a second sequence of symbols to be wirelessly transmitted from the transmitting device to the receiving device via the carrier signal; the phase sequence generator is further configured to generate a second pseudorandom phase sequence number that is different from the first pseudorandom sequence number; and the modulator is further configured to generate a second trellis code representing the second sequence of symbols and to continuously modulating the carrier signal by traversing the second trellis code at a second variable traversal rate determined by the second pseudorandom phase sequence number, the second traversal rate being different from the first traversal rate. In some cases, the modulator is further configured to traverse the trellis code within a period of time that is less than a constant symbol duration. In some cases, the communications system includes a transmitter configured to cause the transmitting device to wirelessly broadcast the modulated carrier signal via an antenna. In some cases, the phase sequence generator is further configured to causing the transmitting device to provide the phase sequence number to the receiving device.

Another example embodiment provides a computer program product including one or more machine-readable mediums encoded with instructions that when executed by one or more processors cause a process of generating featureless LPI/LPD waveforms to be carried out. The process includes receiving a sequence of symbols to be wirelessly transmitted from a transmitting device to a receiving device via a carrier signal; generating a pseudorandom phase sequence number; generating a trellis code representing the sequence of symbols; and continuously modulating the carrier signal by traversing the trellis code at a variable traversal rate that is based on the pseudorandom phase sequence number. In some cases, the pseudorandom phase sequence number changes between different cycles of the carrier signal thereby causing the rate at which the trellis code is traversed to vary between different cycles of the carrier signal. In some cases, the sequence of symbols is a first sequence of symbols, where the trellis code is a first trellis code, where the phase sequence number is a first phase sequence number, where the variable traversal rate is a first variable traversal rate, and where the process includes receiving a second sequence of symbols to be wirelessly transmitted from the transmitting device to the receiving device via the carrier signal; generating a second pseudorandom phase sequence number that is different from the first pseudorandom sequence number; generating a second trellis code representing the second sequence of symbols; and continuously modulating the carrier signal by traversing the second trellis code at a second variable traversal rate determined by the second pseudorandom phase sequence number, the second traversal rate being different from the first traversal rate. In some cases, the trellis code is traversed within a period of time that is less than a constant symbol duration. In some cases, the process includes causing the transmitting device to wirelessly broadcast the modulated carrier signal via an antenna. In some cases, the process includes causing the transmitting device to provide the phase sequence number to the receiving device.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A method of generating featureless low-probability-of-intercept/low-probability-of-detection (LPI/LPD) waveforms, the method comprising:
   receiving a sequence of symbols to be wirelessly transmitted from a transmitting device to a receiving device via a carrier signal;
   generating a pseudorandom phase sequence number;
   generating a trellis code representing the sequence of symbols;
   continuously modulating the carrier signal by traversing the trellis code at a variable traversal rate that is based on the pseudorandom phase sequence number; and
   causing the transmitting device to provide the phase sequence number to the receiving device.

2. The method of claim 1, wherein the pseudorandom phase sequence number changes between different cycles of the carrier signal thereby causing the rate at which the trellis code is traversed to vary between different cycles of the carrier signal.

3. The method of claim 1, wherein the sequence of symbols is a first sequence of symbols, wherein the trellis code is a first trellis code, wherein the phase sequence number is a first phase sequence number, wherein the variable traversal rate is a first variable traversal rate, and wherein the method further comprises:
   receiving a second sequence of symbols to be wirelessly transmitted from the transmitting device to the receiving device via the carrier signal;
   generating a second pseudorandom phase sequence number that is different from the first pseudorandom sequence number;
   generating a second trellis code representing the second sequence of symbols; and
   continuously modulating the carrier signal by traversing the second trellis code at a second variable traversal rate determined by the second pseudorandom phase sequence number, the second traversal rate being different from the first traversal rate.

4. The method of claim 1, wherein the trellis code is traversed within a period of time that is less than a constant symbol duration.

5. The method of claim 1, further comprising causing the transmitting device to wirelessly broadcast the modulated carrier signal via an antenna.

6. The method of claim 5, wherein the broadcasted signal includes an I/Q in-phase/quadrature (IQ) signal.

7. The method of claim 1, further comprising converting input data into the sequence of symbols such that the input data is encoded into the modulated carrier signal via the trellis code.

8. A communication system, comprising:
- a data processor configured to receive a sequence of symbols to be wirelessly transmitted from a transmitting device to a receiving device via a carrier signal;
- a phase sequence generator configured to generate a pseudorandom phase sequence number;
- a modulator operatively coupled to the data processor and to the phase sequence generator, the modulator configured to generate a trellis code representing the sequence of symbols received by the data processor and to continuously modulate the carrier signal by traversing the trellis code at a variable traversal rate that is based on the pseudorandom phase sequence number generated by the phase sequence generator; and
- a transmitter configured to cause the transmitting device to wirelessly broadcast the modulated carrier signal via an antenna.

9. The system of claim 8, wherein the phase sequence generator is configured to change the pseudorandom phase sequence number between different cycles of the carrier signal thereby causing the rate at which the trellis code is traversed to vary between different cycles of the carrier signal.

10. The system of claim 8, wherein the sequence of symbols is a first sequence of symbols, wherein the trellis code is a first trellis code, wherein the phase sequence number is a first phase sequence number, wherein the variable traversal rate is a first variable traversal rate, and wherein:
- the data processor is further configured to receive a second sequence of symbols to be wirelessly transmitted from the transmitting device to the receiving device via the carrier signal;
- the phase sequence generator is further configured to generate a second pseudorandom phase sequence number that is different from the first pseudorandom sequence number; and
- the modulator is further configured to generate a second trellis code representing the second sequence of symbols and to continuously modulating the carrier signal by traversing the second trellis code at a second variable traversal rate determined by the second pseudorandom phase sequence number, the second traversal rate being different from the first traversal rate.

11. The system of claim 8, wherein the modulator is further configured to traverse the trellis code within a period of time that is less than a constant symbol duration.

12. The system of claim 8, wherein the phase sequence generator is further configured to causing the transmitting device to provide the phase sequence number to the receiving device.

13. A computer program product including one or more non-transitory machine-readable mediums encoded with instructions that when executed by one or more processors cause a process of generating featureless low-probability-of-intercept/low-probability-of-detection (LPI/LPD) waveforms to be carried out, the process comprising;
- receiving a sequence of symbols to be wirelessly transmitted from a transmitting device to a receiving device via a carrier signal;
- generating a pseudorandom phase sequence number;
- generating a trellis code representing the sequence of symbols; and
- continuously modulating the carrier signal by traversing the trellis code at a variable traversal rate that is based on the pseudorandom phase sequence number, wherein the trellis code is traversed within a period of time that is less than a constant symbol duration.

14. The computer program product of claim 13, wherein the pseudorandom phase sequence number changes between different cycles of the carrier signal thereby causing the rate at which the trellis code is traversed to vary between different cycles of the carrier signal.

15. The computer program product of claim 13, wherein the sequence of symbols is a first sequence of symbols, wherein the trellis code is a first trellis code, wherein the phase sequence number is a first phase sequence number, wherein the variable traversal rate is a first variable traversal rate, and wherein the process further comprises:
- receiving a second sequence of symbols to be wirelessly transmitted from the transmitting device to the receiving device via the carrier signal;
- generating a second pseudorandom phase sequence number that is different from the first pseudorandom sequence number;
- generating a second trellis code representing the second sequence of symbols; and
- continuously modulating the carrier signal by traversing the second trellis code at a second variable traversal rate determined by the second pseudorandom phase sequence number, the second traversal rate being different from the first traversal rate.

16. The computer program product of claim 13, the process further comprising causing the transmitting device to wirelessly broadcast the modulated carrier signal via an antenna.

17. The computer program product of claim 13, the process further comprising causing the transmitting device to provide the phase sequence number to the receiving device.

* * * * *